(No Model.)
J. A. BOTTOMLEY.
FRUIT PICKER.
No. 296,514. Patented Apr. 8, 1884.
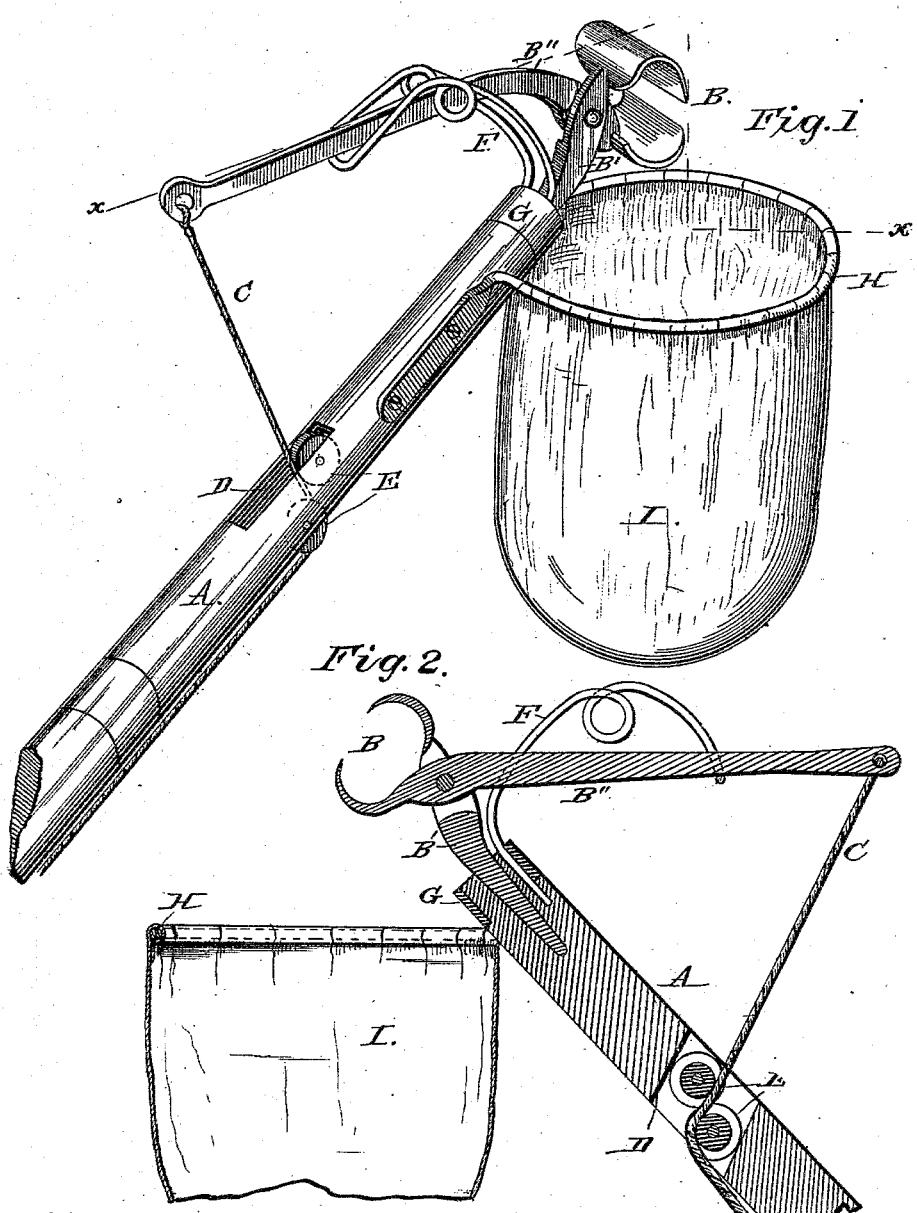
WITNESSES:
Fred. G. Dieterich
J. Fred. Reidy
INVENTOR.
Joseph A. Bottomley
By Louis Bagger & Co.
ATTORNEYS

UNITED STATES PATENT OFFICE.

JOSEPH ALFRED BOTTOMLEY, OF GREENVILLE, CONNECTICUT.

FRUIT-PICKER.

SPECIFICATION forming part of Letters Patent No. 296,514, dated April 8, 1884.

Application filed November 2, 1883. (No model.)

*To all whom it may concern:*

Be it known that I, JOSEPH A. BOTTOMLEY, a citizen of the United States, and a resident of Greenville, in the county of New London and State of Connecticut, have invented certain new and useful Improvements in Fruit-Pickers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved fruit-picker, and Fig. 2 is a vertical section of the same on line $x\, x$.

Similar letters of reference indicate corresponding parts in both the figures.

My invention has relation to that class of fruit-pickers which have a cutter operated by a cord and a bag for receiving the fruit secured at the end of a pole; and it consists in the detailed construction and combination of parts of the same, as hereinafter more fully described and claimed.

In the accompanying drawings, the letter A indicates a pole, preferably made in sections or joints, so as to be made longer or shorter at will, and a pair of tongs or nippers, B, having sharp wide cutting edges or jaws $b$, are secured with one leg, B', in the end of the pole, which is provided with a ferrule, G, preventing its splitting. The jaws of the nippers are placed so as to be at right angles to the axis of the pole, and may be slipped, when opened, sidewise over the stem of the fruit to be picked, bringing the fruit directly over the mouth of the receiving-bag. This bag consists of a bail, H, secured at both ends to the pole below the ferrule, and of a bag, I, supported by and attached to the hoop at its (the bag's) upper edges, having its mouth directly under the jaws of the nippers. The free leg B" of the nippers forms an eye at its outer end, to which a cord, C, is attached, which passes between two pulleys, E, journaled in a longitudinal slot, D, in the pole, and passes along the pole, which cord serves to close the jaws of the nippers. A spring, F, is secured with its ends between the upper end of the pole and the ferrule, forming a double arch, having coils upon the middle of the arches, and having its doubled end bearing against the inner edge of the free arm of the nippers, forcing the arms, and through them the jaws, apart. By this construction of the spring it will be seen that the doubled end of the spring will gradually slide in upon the arm of the nippers as the latter is drawn inward, increasing the leverage of the arm as the tension of the spring is increased by being compressed, and likewise causing the spring to slide farther out upon the free arm of the nippers when the latter is released, as the tension of the spring decreases by expansion, thus making the force exerted by the spring upon the arm of the nippers even at all positions of the arm and spring. It will also be seen that the jaws of the cutter are slipped over the stem of the fruit to be picked from the side, allowing the fruit to drop into the bag, when the jaws are closed.

I am aware that fruit-pickers have been made consisting of a bag or similar receptacle having a pair of cutters operated by a cord attached above it, both mounted upon the end of a pole; and I am also aware that nippers or cutters operated by a cord and adapted to be closed across the stem of the fruit have been made, and I do not wish to claim such construction, broadly; but

I claim—

In a fruit-picker, the combination of the pole having a bag or receptacle at its end, and having pulleys in a longitudinal slot near the end, a pair of cutters or nippers secured with one arm in the end of the pole, and having their cutting-edges at right angles to the axis of the pole, an operating-cord attached to the end of the free arm of the cutters and passing between the pulleys in the pole, a spring secured in the end of the pole and forming a double arch, having coils at the middle of the arches, and having its doubled end bearing against and sliding upon the inner edge of the free arm, as and for the purpose shown and set forth.

In testimony that I claim the foregoing as my own I have hereunto affixed my signature in presence of two witnesses.

JOSEPH ALFRED BOTTOMLEY.

Witnesses:
MATTHEW TELFORD,
GEORGE FREDERICK BROOKS.